No. 739,086. PATENTED SEPT. 15, 1903.
J. F. KELLER.
MACHINE FOR CUTTING DIES.
APPLICATION FILED JAN. 19, 1903.
NO MODEL. 3 SHEETS—SHEET 2.

WITNESSES: INVENTOR.
Joseph F. Keller
BY
George Berk,
ATTORNEY.

No. 739,086. PATENTED SEPT. 15, 1903.
J. F. KELLER.
MACHINE FOR CUTTING DIES.
APPLICATION FILED JAN. 19, 1903.
NO MODEL. 3 SHEETS—SHEET 3.
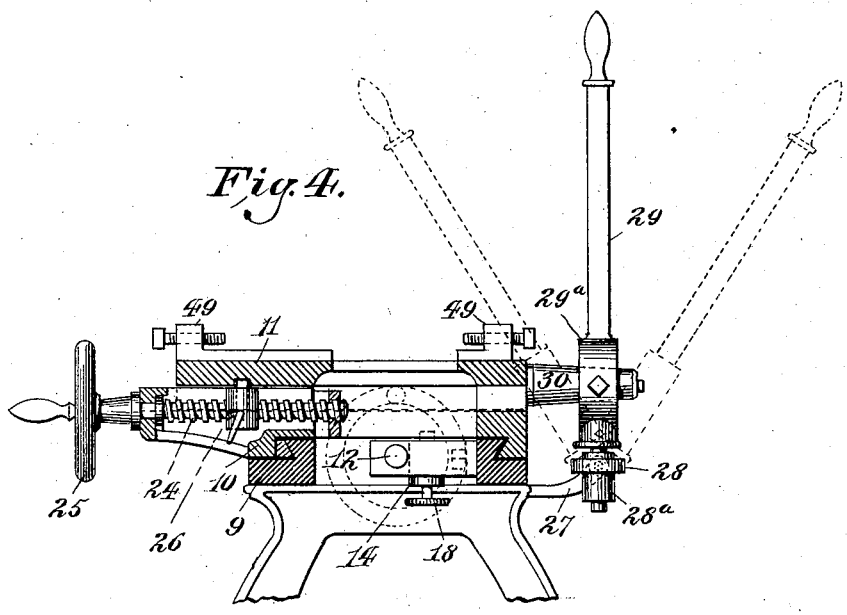
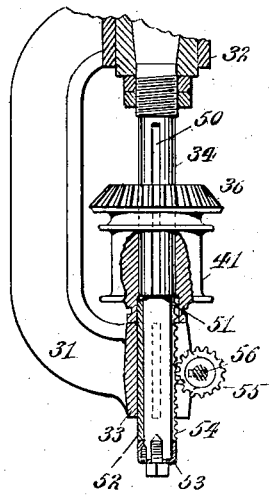
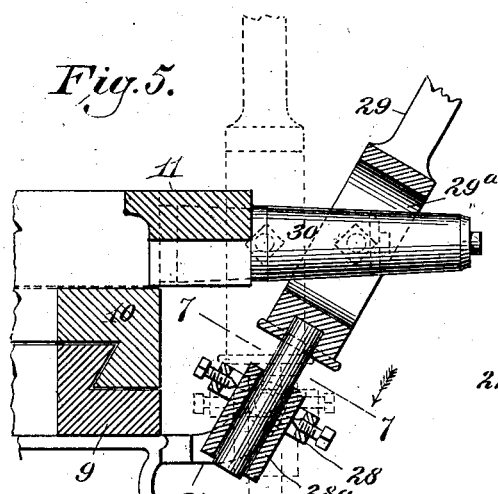
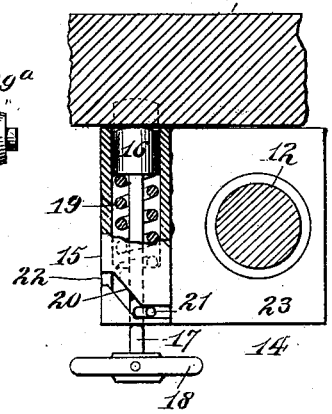
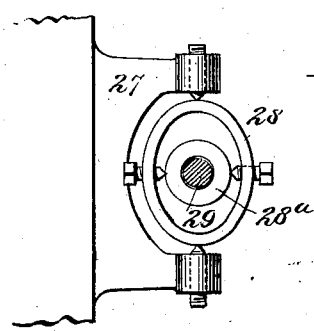
WITNESSES
M. Van Nortwick
W. H. Stubbs
INVENTOR.
Joseph F. Keller
BY George Cook
ATTORNEY.

No. 739,086. Patented September 15, 1903.

UNITED STATES PATENT OFFICE.

JOSEPH F. KELLER, OF NEW YORK, N. Y.

MACHINE FOR CUTTING DIES.

SPECIFICATION forming part of Letters Patent No. 739,086, dated September 15, 1903.

Application filed January 19, 1903. Serial No. 139,508. (No model.)

*To all whom it may concern:*

Be it known that I, JOSEPH F. KELLER, a citizen of the United States, and a resident of New York, borough of Manhattan, in the county of New York and State of New York, have made and invented certain new and useful Improvements in Machines for Cutting Dies, of which the following is a specification.

My invention relates to an improvement in machines for milling or cutting dies, the object of the same being to produce a device of this character whereby the work may be more easily and readily performed and with far more precision and exactness than has heretofore been possible with machines devised for the same purpose.

With these and other ends in view my invention consists in certain novel features of construction and combinations of parts, as will be hereinafter fully described, and pointed out in the claims.

Figure 1:
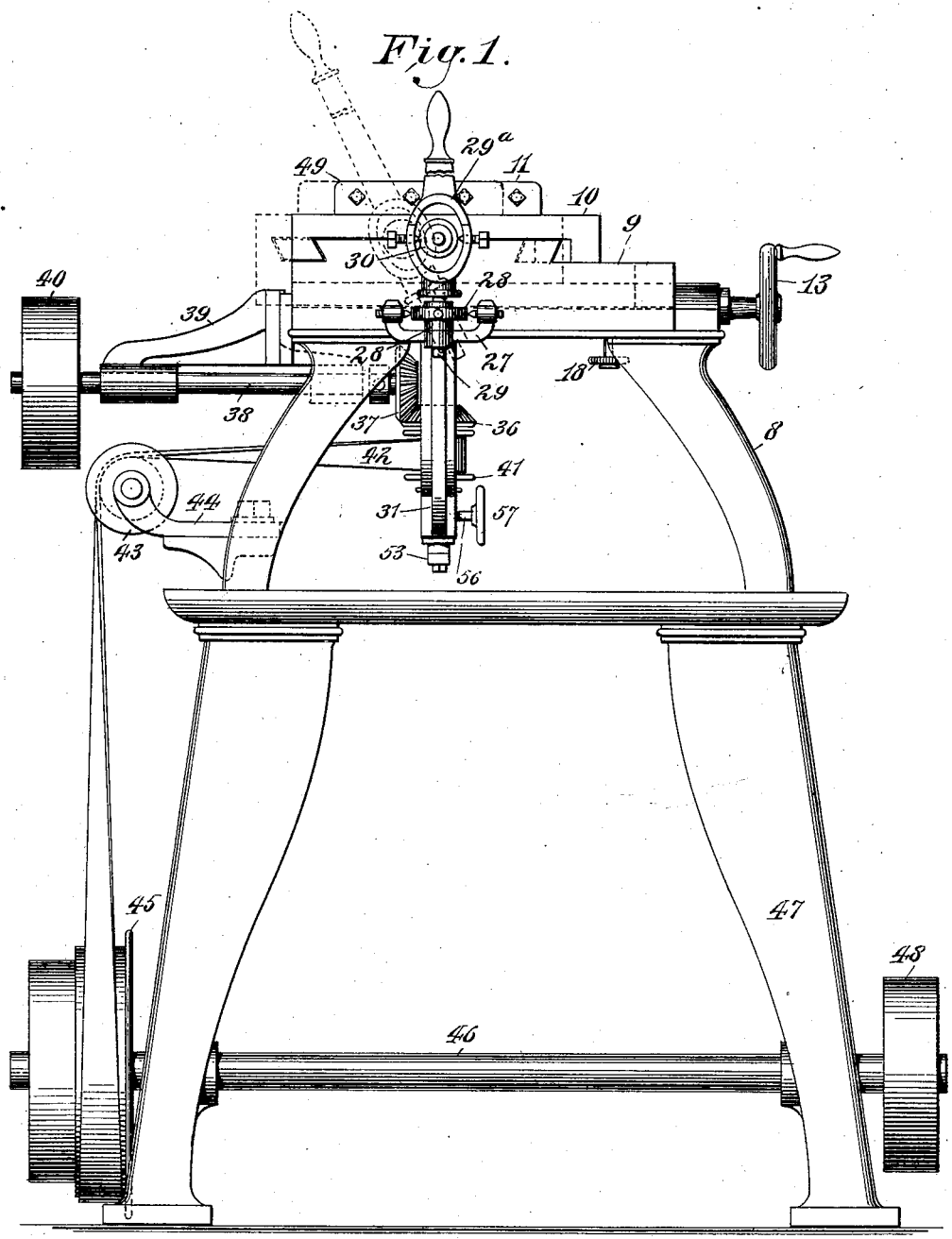
Figure 2:
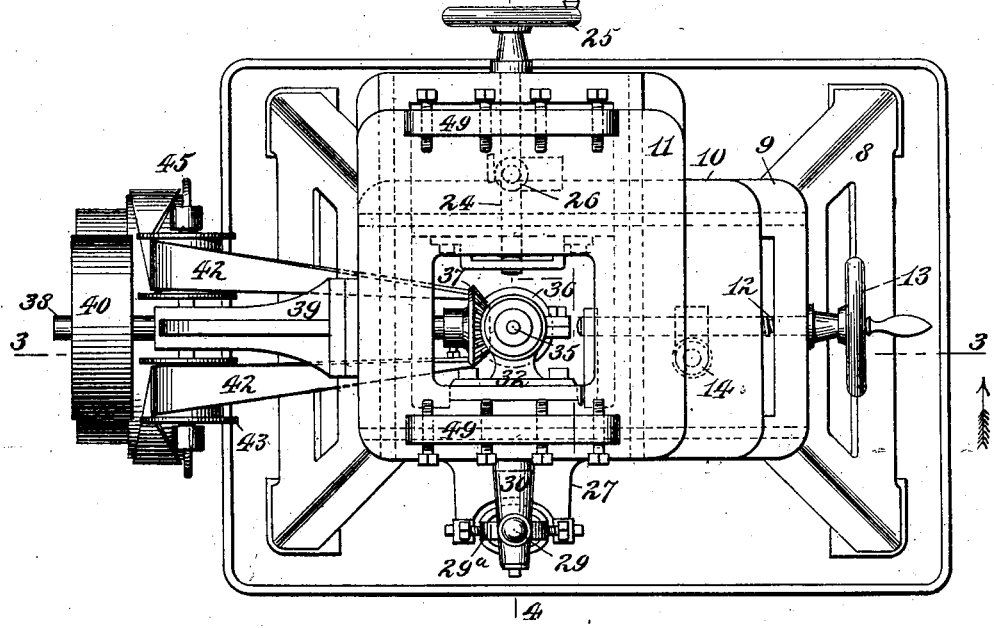

In the accompanying drawings, Figure 1 is a view in side elevation of my improved machine. Fig. 2 is a plan view of the same, and Fig. 3 a sectional view taken on the line 3 3 of Fig. 2. Fig. 4 is a sectional view taken on the line 4 4 of Fig. 2. Figs. 5, 6, and 7 are detail views, the latter being taken on the line 7 7 of Fig. 5. Fig. 8 is a view, partly in section and partly in elevation, of the means for vertically adjusting the milling-tool.

Referring to the drawings, 8 represents the framework of the machine, of any suitable or desired construction and provided with the rectangular frame or bed 9, upon which rests the die-holder, consisting of the plates 10 and 11, adapted to be moved, as hereinafter described, in horizontal planes and at right angles to each other, said die-holder being provided with a central opening through which the milling-tool projects, the machine being so constructed and arranged that the die, with its holder, is moved toward and away from the revolving milling-tool, in contradistinction to those machines wherein the die is held stationary and the revolving milling-tool moved or fed to the die-blank.

Figure 3:
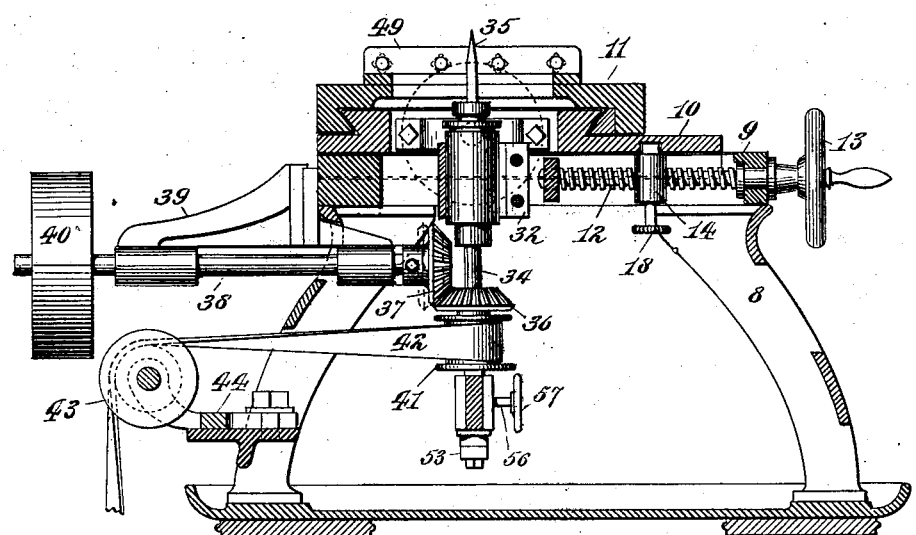

In the frame 8 are journaled the ends of the screw 12, the outer end of the latter being provided with the hand-wheel 13, whereby the same is rotated, said screw carrying thereon the locking device 14, as illustrated in Figs. 3 and 6. This locking device consists of the barrel or cylinder 15, in which is fitted the lock proper, 16, secured to one end of the stem 17, the opposite end of the stem projecting through the closed lower end of the barrel or cylinder and provided with the disk 18 for turning or rotating the same, a spring 19 being contained within said cylinder and bearing at one end against the lock proper, 16, and at the opposite end against the closed lower end of said barrel. In one side of the cylinder or barrel 15 is formed the cam-slot 20, into which projects the pin or lug 21, secured to the stem 17, whereby when said stem is rotated in one direction said pin 21 will ride up said slot until it projects into the horizontal portion 22, in which position it is held by the tension of said spring 19, the lock proper, 16, being thereby raised until it passes into an opening or recess formed to receive it in the plate 10, as illustrated in Fig. 3. The barrel 15 has secured thereto or formed integral therewith the plate or lug 23, provided with an opening into which the screw 12 is threaded and through which the same passes, the result being that when the parts are adjusted as illustrated in Fig. 3—that is, with the lock 14 in engagement with the plate 10— the latter may be moved in a horizontal plane upon the bed 9 by turning the hand-wheel 13, said lock 14 traveling to the right or left and carrying the plate 10 with it, in accordance with the direction in which said wheel 13 is rotated. When, however, it is desired to move the plate 10 independently of said screw 12, it is simply necessary to turn the disk 18 in the proper direction, and thereby throw the lock 14 out of engagement with said plate 10. On the plate 10 is mounted the plate 11, adapted and arranged to move thereon and at right angles thereto, its travel being regulated by means of the screw 24, the ends of which are mounted in the frame of the machine and the outer end provided with the hand-wheel 25 for turning the same. On this screw is mounted the locking device 26, similar in construction to the locking device 14, already described, and adapted to be thrown into and out of engagement with the plate 11, so that when the locking device 26 is thrown into engagement with the plate 11 the latter may be moved backwardly or forwardly by means of the hand-wheel 25, the said plate 11, however, being independent of the screw when the locking device 26 is thrown out of engagement with said plate.

From the foregoing it will be understood that by properly turning the hand-wheels 13 and 25 the plates 10 and 11 may be moved in parallel horizontal planes and in directions at right angles to each other. When the locking devices, however, are disengaged from the plates, the latter are wholly independent of the screws 12 and 24 and may be moved independent of said screws by the means hereinafter described.

On the frame of the machine is secured or formed integral therewith the bifurcated plate 27, in which is pivotally mounted the ring 28, the latter in turn having pivoted thereto the sleeve 28ª, in which sleeve is fitted the lower end of the lever 29, this construction and arrangement forming, practically, a universal joint, whereby the lever may be moved either backwardly or forwardly or from right to left. The lever 29 is formed with the ring 29ª, through which projects an arm 30, projecting outwardly from the plate 11, and to which arm the ring is pivotally connected, so that when the lever 29 is moved backwardly or forwardly the said plate 11 will be moved in a corresponding direction upon the plate 10, and when moved to the right or left the two plates 10 and 11, constituting the die-holder, will be moved in a corresponding direction on the frame or bed 9.

In the bracket 31, Fig. 1, formed with the bearings 32 33, Fig. 3, is mounted the vertically-adjustable spindle 34, adapted in its upper end to carry the removable milling or cutting tool 35, the latter projecting up through the central opening in the die-holder, said spindle having keyed thereto the gear 36, meshing with the gear 37, secured to the inner end of the horizontal shaft 38, said shaft being mounted in the bracket 39, secured to the bed or frame of the machine and carrying at its outer end the pulley 40, the gear 37 being so keyed to its shaft 38 that it may be moved into or out of engagement with the gear 36 when desired. Integral with the gear 36 is formed the pulley 41, around which passes the belt 42, the latter traveling over the idlers 43, mounted in the bracket 44, and around the pulley 45, secured to one end of the shaft 46, the latter being mounted in bearings formed on or secured to the legs or standards 47, the opposite end of the shaft 46 carrying the pulley 48, around which also passes the belt (not shown) in order to impart motion thereto from any suitable source.

In cutting the die the blank which has the outline traced thereon is secured on the die-holder 10 11 between the flanges 49. Motion is imparted to the spindle through the gears 36 37 by means of a belt (not shown) passing around the pulley 40, said spindle being provided with a comparatively heavy cutting-tool 35, the locking devices 14 and 26 having first been thrown into engagement with their respective screws, as hereinbefore described. By manipulating the hand-wheels 13 and 25 the die-holder is caused to move in such directions that its attached die will be "roughed out," the operator following closely the outline traced on the blank, but at the same time avoiding cutting on the line itself, it having been found by reason of the fact that there is always more or less lost motion when using the screws it is often impossible to reverse the hand-wheels in time to avoid cutting beyond the line.

In finishing the die the heavy cutting or milling tool is removed and a lighter tool substituted therefor. The gear 37 is disengaged from the gear 36 by sliding it outwardly on its shaft 38, as indicated in dotted lines, Fig. 3, and the locking devices 14 and 26 thrown out of engagement with the plates 10 and 11. Motion is now imparted to the spindle through the shaft 46 and belt 42 and the die-holder moved in proper directions by the proper manipulation of the lever 29, by means of which the operator can follow exactly the outline traced on the die-blank with far more exactness than is possible when said die-holder is moved by the screws.

In order to vertically adjust the spindle 34, carrying the milling-tool 35, I provide the gear-pulley 36 to 41 with a key (not shown) extending into the slot 50, formed in the spindle 34, whereby said spindle and gear-pulley will be simultaneously rotated and at the same time allow the spindle to be adjusted vertically without vertically moving said gear-pulley. By reference to Fig. 8 it will be seen that the lower end of the spindle 34 is somewhat reduced in diameter, forming a shoulder 51, and around which end of the spindle is fitted the sleeve or bushing 52, the upper end of said sleeve or bushing resting against the shoulder 51 and the lower end extending downwardly through and beyond the bearing 33 and fitting against a cap 53, bolted or otherwise secured to the extreme lower end of the spindle 34. One side of the bushing or sleeve 52 is provided with the rack 54, with the teeth of which engages the pinion 55, mounted on the shaft 56, the latter being provided with the hand-wheel 57, Figs. 1 and 3.

It will be understood from the foregoing description that by properly turning the handle 57 the bushing or sleeve 52 may be raised or lowered, carrying with it the spindle 34 and its attached milling-tool 35, the gear-pulley 36 to 41 remaining stationary, as before described.

By means of the machine constructed as above described I am enabled to do better work in less time than has heretofore been possible with machines in common use, as in the initial operation of cutting or roughing out the die a slow speed and greater power is imparted through the gears 34 and 37 during the heavy-cutting or roughing-out operation and high speed with less power by means of the belt 42 during the finishing operation.

Having fully described my invention, what I claim as new, and desire to secure by Letters Patent, is—

1. In a machine of the character described, the combination with a bed or frame, of a sectional die-holder, the sections adapted to move one upon the other and upon said bed or frame, screws adapted to be thrown into engagement with said die-holder for controlling the movements of the sections thereof, a lever connected with said die-holder for controlling the movements thereof when disengaged from said screws, a vertical cutting or milling tool and means for imparting motion to said tool, substantially as described.

2. In a machine of the character described, the combination with a bed or frame, of a sectional die-holder supported by and moving thereon, screws adapted to be engaged and disengaged with said die-holder, a lever connected with said die-holder for controlling the movements thereof when disengaged from said screws, a vertical cutting or milling tool and means connected with said milling-tool for imparting a rotating movement of different speeds thereto, substantially as described.

3. In a machine of the character described, the combination with a bed or frame, of a sectional die-holder supported by and moving thereon, screws carried by said frame, locking devices mounted on said screws and adapted to be engaged or disengaged from the sections of said die-holder, a lever supported by said frame and connected with said die-holder for controlling the movements thereof when disengaged from said screws, a vertical cutting or milling tool and means for imparting motion to the latter, substantially as described.

4. In a machine of the character described, the combination with a bed or frame, of a sectional die-holder supported by and moving thereon, screws carried by said frame and adapted to be thrown into and out of engagement with the sections of said die-holder for controlling the movements thereof, a lever secured to said frame and to said die-holder for controlling the movements thereof when disengaged from said screws, a vertical spindle supported in said frame and carrying a cutting or milling tool, a rotating shaft 38 provided at one end with a movable gear adapted to be engaged and disengaged from a similar gear carried by said spindle for imparting motion to the latter, and independent means for imparting motion to said spindle when said gears are disengaged, substantially as described.

Signed at New York, borough of Manhattan, in the county of New York and State of New York, this 27th day of December, A. D. 1902.

JOSEPH F. KELLER.

Witnesses:
M. VAN NORTWICK,
GEORGE COOK.